Jan. 10, 1961 S. FRIEDLAND ET AL 2,967,329
MANUFACTURE OF HOLLOW INFLATED PLASTIC OBJECTS
Filed April 5, 1957 5 Sheets-Sheet 1
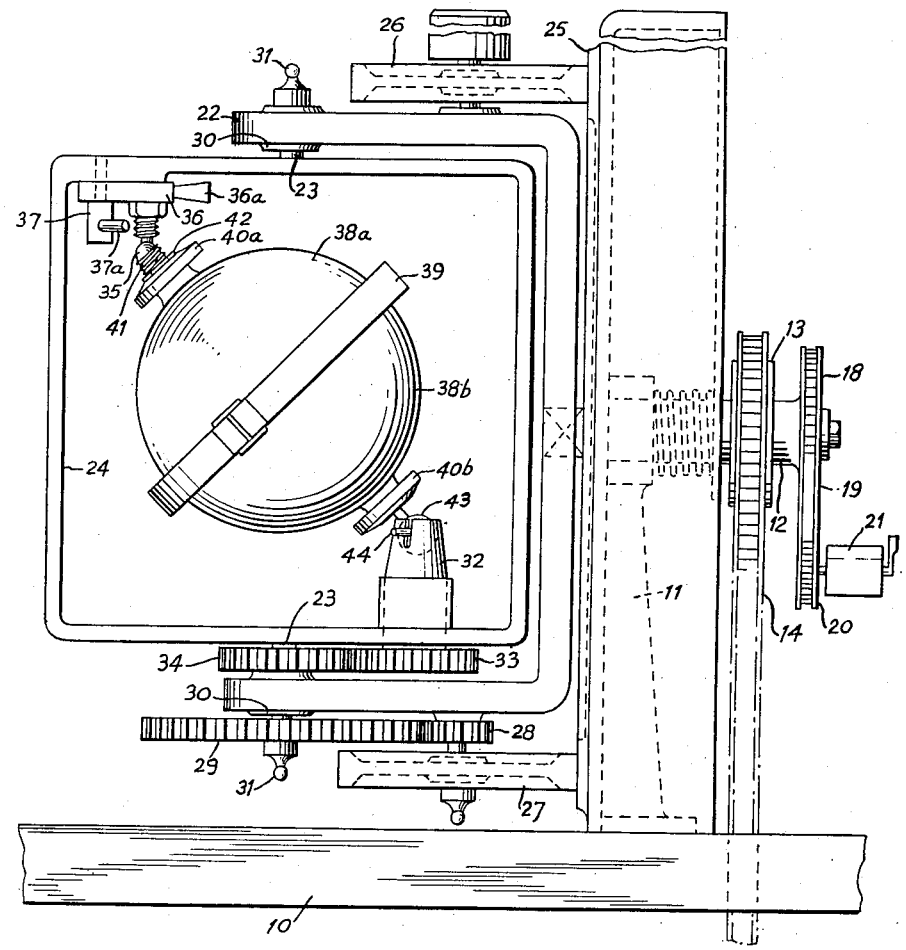
FIG. 1
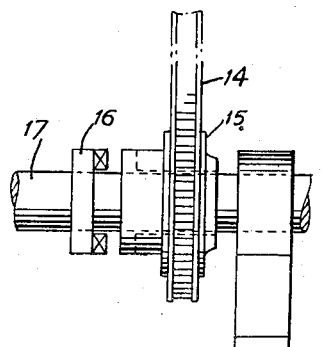
INVENTORS.
S. FRIEDLAND, J. W. SUTTON,
J. DOGGARD, D. F. BARTON.
BY
ATTORNEYS.

Jan. 10, 1961     S. FRIEDLAND ET AL     2,967,329
MANUFACTURE OF HOLLOW INFLATED PLASTIC OBJECTS
Filed April 5, 1957     5 Sheets-Sheet 2

INVENTORS.
S. FRIEDLAND
J. W. SUTTON
J. DOGGARD
D. F. BARTON

BY Bierman + Bierman
ATTORNEYS

Jan. 10, 1961 S. FRIEDLAND ET AL 2,967,329
MANUFACTURE OF HOLLOW INFLATED PLASTIC OBJECTS
Filed April 5, 1957 5 Sheets-Sheet 4

INVENTORS.
S. FRIEDLAND
J. W. SUTTON
J. DOGGARD
D. F. BARTON
BY
ATTORNEYS

United States Patent Office 2,967,329
Patented Jan. 10, 1961

2,967,329

MANUFACTURE OF HOLLOW INFLATED PLASTIC OBJECTS

Siegmund Friedland, Highfield, Upton, Macclesfield, John William Sutton, Macclesfield, John Doggart, High Trees, Titierington, Macclesfield, and Dennis F. Barton, Congleton, England, assignors to V. & E. Plastics Limited, a company of Great Britain Filed Apr. 5, 1957, Ser. No. 651,033

Claims priority, application Great Britain Apr. 6, 1956

9 Claims. (Cl. 18—26)

This invention relates to the manufacture of hollow inflated plastic objects and is particularly, though not exclusively, applicable to the manufacture of inflated balls of polyvinylchloride (P.V.C.).

Heretofore, inflated balls of P.V.C. have usually been made by joining together two pre-moulded halves or hemispheres. Apart from the difficulty of the joint, such method of manufacture makes it easier to provide uniform wall thickness and therefore, on inflation, it is easier to retain a spherical shape. Such method of manufacture entails the operations of pre-moulding and joining, with half-moulds and special ancillary equipment and the object of the present invention is a more simple and improved method of manufacture enabling the same to be made in one piece and with a sufficiently uniform wall thickness throughout.

The invention comprises the method of manufacture of a hollow inflatable object, such as a ball, from P.V.C. comprising the several steps of placing a liquid plastic such as P.V.C. paste in a dividable mould, turning said mould continuously so that all inner surfaces are several times presented to the liquid paste as a lowermost surface within the mould so that the paste can flow onto such surface, and applying a flame directly to the outside of the mould to heat same quickly and cause the plastic to gel and cure and then dividing the mould and removing the plastic object therefrom.

The method aforesaid may be characterised in that the mould is so turned that all areas of the inner surface of the mould are substantially presented at a lowermost point for the same length of time; or further characterised in that the mould is rotated about the centre of such object.

The invention further comprises the apparatus for carrying out the method aforesaid.

In the accompanying drawings:

Fig. 1 is a side elevation of one example of a machine for the manufacture of a P.V.C. ball in accordance with the present invention;

Figure 2:
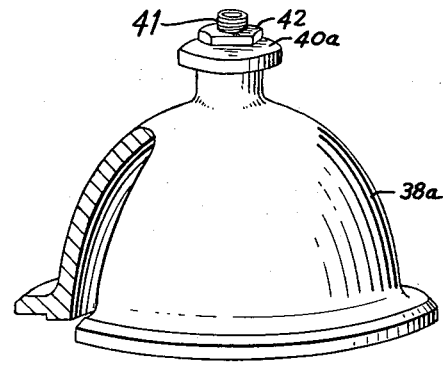
Fig. 2 is an exploded view in part section showing in detail the mould for a single ball, suitable for a football, included in Fig. 1.
Figure 2:
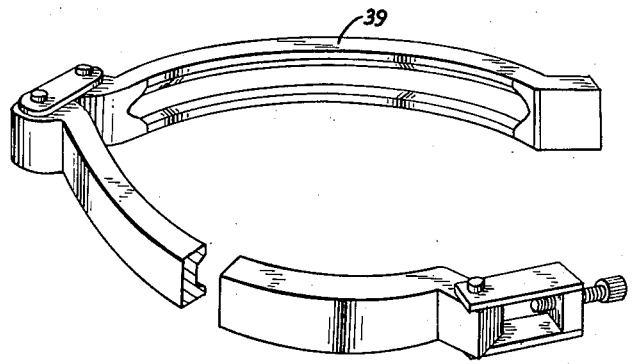
Figure 2:
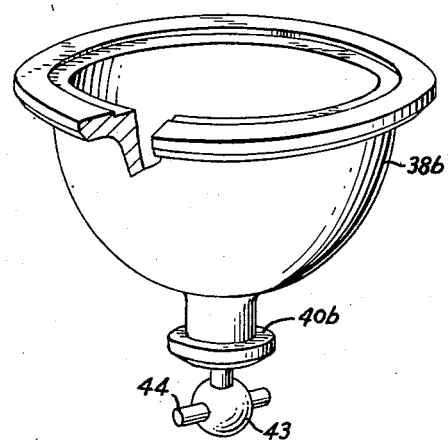

As shown in the drawings there is a main frame 10 on which are three stations for the simultaneous manufacture of a plastic ball or balls. Each station, of which one only is shown, comprises a bearing bracket 11, secured to the frame, carrying a spindle 12 with chain sprocket 13 connected by chain 14 to the chain sprocket 15 of an electric clutch 16 (shown diagrammatically) mounted on a common shaft 17. The spindle 12 also carries a second chain sprocket 18 coupled by chain 19 to the sprocket 20 of a standard re-settable revolution counter stop-switch 21. On the other end of the spindle 12 is mounted a rectangular fork 22 carrying journals for the stub axles 23 of a rectangular gimbal 24. Carried by the bracket 11 is a disc-like driving plate 25 adapted to form an annular track for a pair of rollers 26, 27 mounted on the arms of the fork 22, the roller 27 driving a pinion 28 having 18 teeth in mesh with a larger pinion 29 having 70 teeth, the spindle of which larger pinion is one of the stub axles 23 secured to the gimbal 24. The stub axles 23 are journalled in bosses 30 at the ends of the fork 22 and are provided with grease nipples 31 to facilitate lubrication of such stub axles. The roller 27 is 5¼ inches diameter and engages a track of approximately 14 inches diameter.

In the side of the gimbal adjacent the arm carrying the roller 27 is journalled a socket 32 having a gear wheel 33 with 30 teeth meshing with a wheel 34 having 30 teeth secured to the boss 30 of the fork 22 co-axially with the stub axle 23. Diagonally from the socket 32 is a ball-ended pin 35 attached to an arm 36 pivotally mounted on a clamping bolt 37, the bolt having a lever 37a and the arm 36 having a handle 36a.

The ball mould as shown in Fig. 2 is in two halves 38a, 38b adapted to be secured by a clamping ring 39. Each mould section has axial boss 40a, 40b to co-operate with power actuated separating means not described. One boss has a socket consisting of a screw 41 adapted to be secured by a locking nut 42. The other mould section has a ball-headed peg 43 fitted with a cross pin 44.

In use, a measured quantity of P.V.C. paste is inserted in one half of the mould and then the other half section is clamped thereto. The mould is then mounted in the gimbal, as shown in Fig. 1 so that its axis is approximately at 45 degrees diagonally across the gimbal. This is possible by unclamping the arm 36 and swinging it out and then back again when the ball has been fitted into position in the socket and on the peg, when the arm can be secured by the clamp 35. The counter switch is set, and the fork and gimbal started to turn while a gas flame 51 from burner 50 is directed against the mould. The mould turns on its own axis at the same time as being turned about horizontal and vertical axes passing through the centre of the mould. After a predetermined number of revolutions, for example 150 at 60 r.p.m., the plastic is substantially cured as a ball within the mould. As the mould is turned in the machine all areas therein are brought several times to a lowermost position so that the plastic contacts the heated surface of the mould and forms a skin. By this means a skin of substantially uniform thickness is formed in the ball. After being suitably cooled the mould is opened and the moulded shape extracted.

Figure 3:
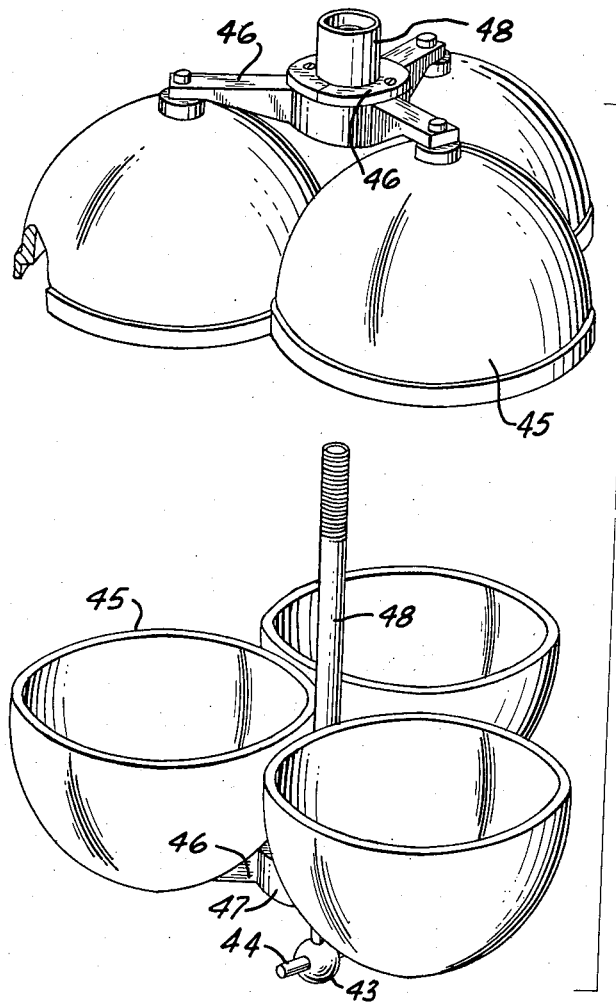
Figs. 3 and 4 are exploded views of alternative plural mould units for use in the same machine in place of the mould shown in Fig. 2.
Figure 4:
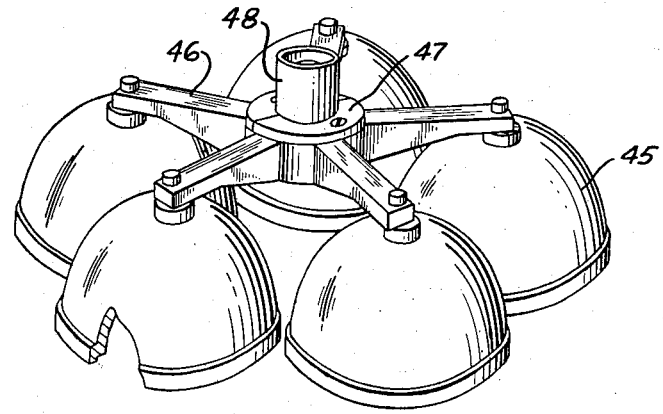
Figure 4:
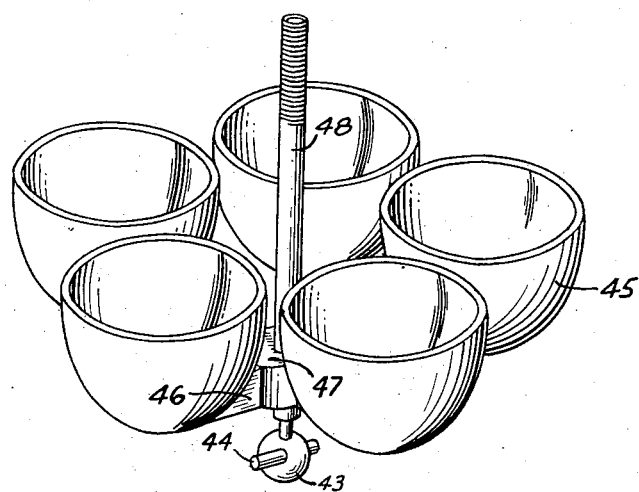
Figure 5:
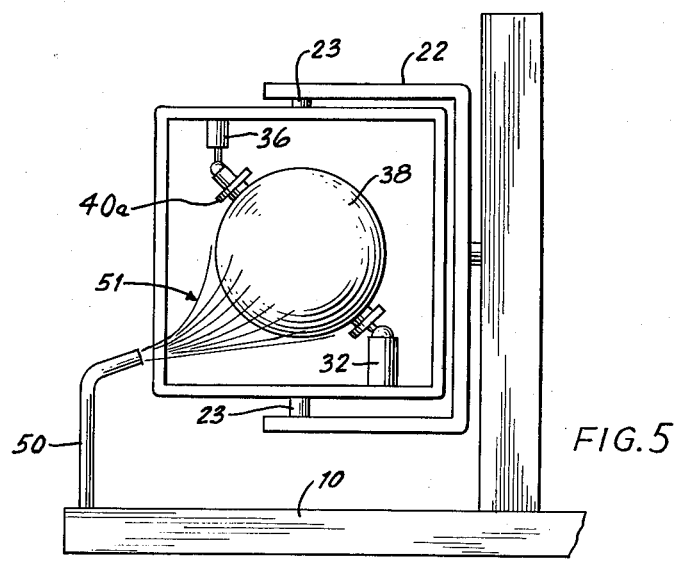
Fig. 5 is a side elevation of the machine shown in Fig. 1 including flame impinging means.
Figure 6:
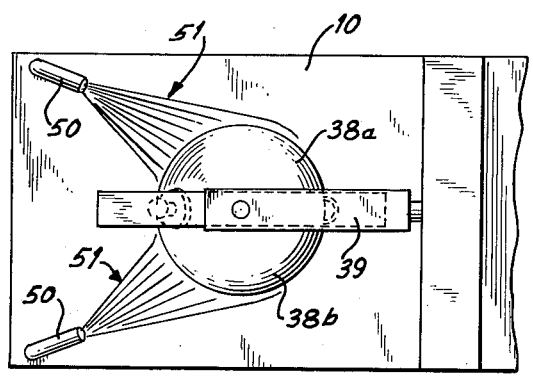
Fig. 6 is a plan view of the machine shown in Fig. 1 including two flame impinging means.

As shown in Figs. 3 and 4 the mould may be of multiple type adapted to fit into the same machine illustrated in Fig. 1. The half-sections of each ball mould 45 are carried by the arms 46 of spiders 47 which are adapted to be secured together by a clamping bolt 48 at the axes of the spiders. The ends of the spider have complementary ball and socket formations to fit those of the machine.

We claim:

1. A method of making hollow inflatable objects which comprises placing in a divisible mold a liquid gellable plastic, turning said mold continuously along a plurality of axes at such angles that they pass through said mold a sufficient number of times so that all inner faces of said mold are contacted several times by said liquid plastic, applying heat at a localized area at the lowermost surface on the outside of said mold to heat the same quickly to cause said plastic to gel, whereby all areas of the inner surface of said mold are presented at said area for substantially the same length of time, said heat being obtained by a flame directly impinging on said area.

2. A method according to claim 1 in which the rotation of said mold is along three axes at angles to each other and passing through said mold.

3. A method according to claim 2 in which two of the axes are at right angles and the third at 45°.

4. Apparatus for making hollow inflatable objects comprising a base, a rectangular-shaped fork mounted on said base with means for rotating the same about an axis at right angles to the central portion thereof, a gimbal rotatably mounted in said fork on an axis at right angles to said fork axis, a mold rotatably mounted in said gimbal on an axis at an angle to aforesaid axes, and means for directing a flame against a localized area of said mold.

5. Apparatus according to claim 4 in which said mold axis is at an angle of 45° to the other two axes.

6. Apparatus according to claim 4 in which said fork is provided with a plurality of rollers, and a disk on said base contacted by said rollers.

7. Apparatus according to claim 4 further characterised by driving means for the inner frame comprising spur gearing one wheel of which is mounted on the axle of such inner frame and another wheel of which carries a friction drive rim.

8. Apparatus according to claim 4 further characterised by driving means for rotating the mould on its diagonal axis comprising a stationary gear pinion coaxial with the axle of the inner frame of the gimbal and a complementary gear pinion coupled to the axle of the mould.

9. Apparatus according to claim 7 further characterised in that the axis of the complementary gear pinion is mounted on a shaft having its axis parallel to the axis of the inner frame and in that the inner end of the shaft comprises a ball and socket driving joint for the axle of the mould.

References Cited in the file of this patent

UNITED STATES PATENTS

| | | |
|---|---|---|
| 803,799 | Voelke | Nov. 7, 1905 |
| 1,558,792 | Churchill | Oct. 27, 1925 |
| 1,875,031 | Landau | Aug. 30, 1932 |
| 1,998,897 | Kay | Apr. 23, 1935 |
| 2,222,266 | Rubissow | Nov. 19, 1940 |
| 2,278,858 | Fields | Apr. 7, 1942 |
| 2,440,377 | Myers | Apr. 27, 1948 |
| 2,477,899 | Rempel | Aug. 2, 1949 |
| 2,629,131 | Martin et al. | Feb. 24, 1953 |
| 2,659,107 | De Bell | Nov. 17, 1953 |
| 2,790,997 | Kurtz | May 7, 1957 |
| 2,811,747 | Belz | Nov. 5, 1957 |
| 2,812,551 | Chupa | Nov. 12, 1957 |
| 2,881,476 | Page | Apr. 14, 1959 |

FOREIGN PATENTS

| | | |
|---|---|---|
| 808,167 | Great Britain | Jan. 29, 1959 |